May 5, 1925. 1,536,912
W. W. NUGENT
OIL PURIFYING MECHANISM
Original Filed Feb. 23, 1918 2 Sheets-Sheet 1
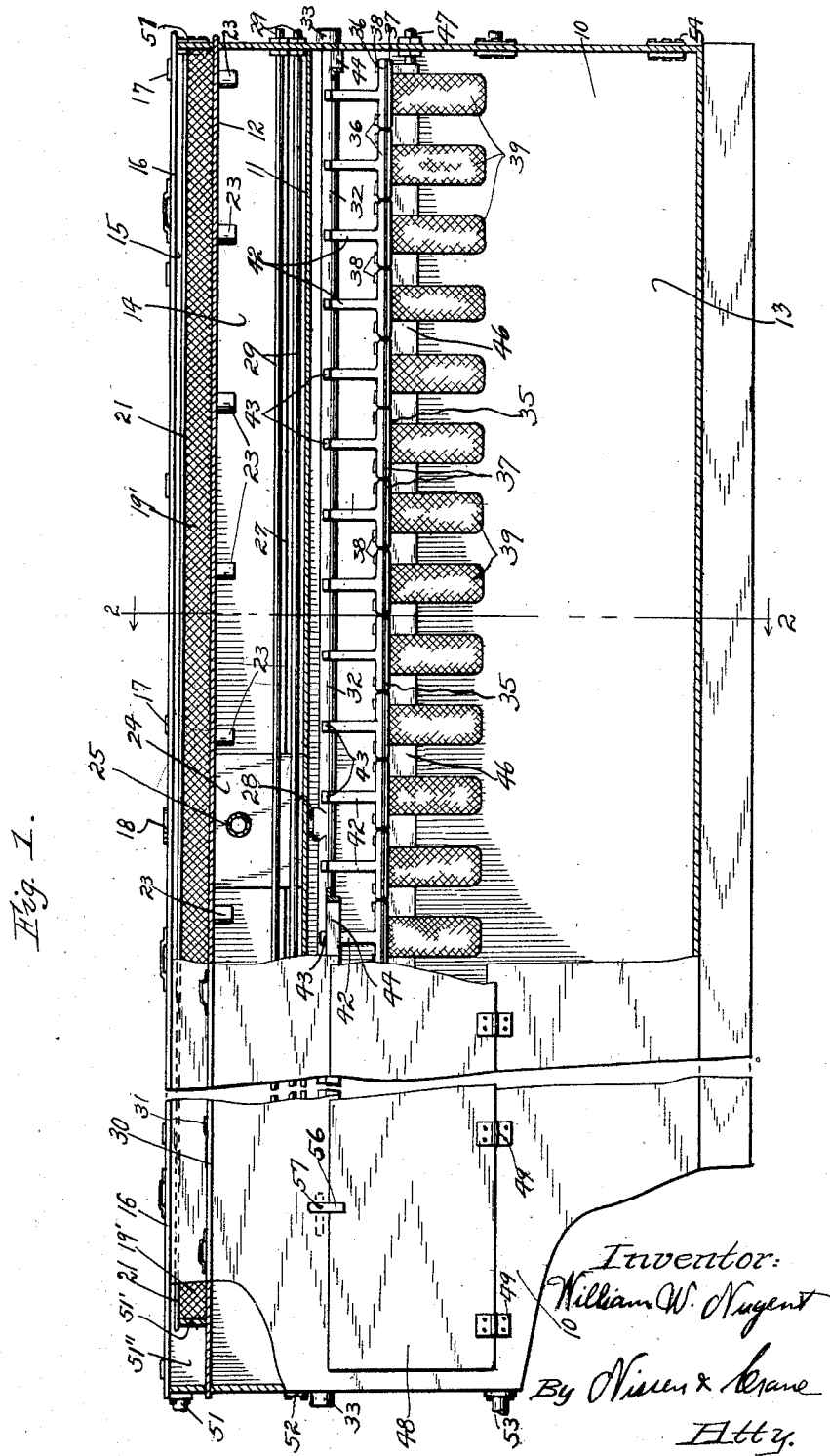

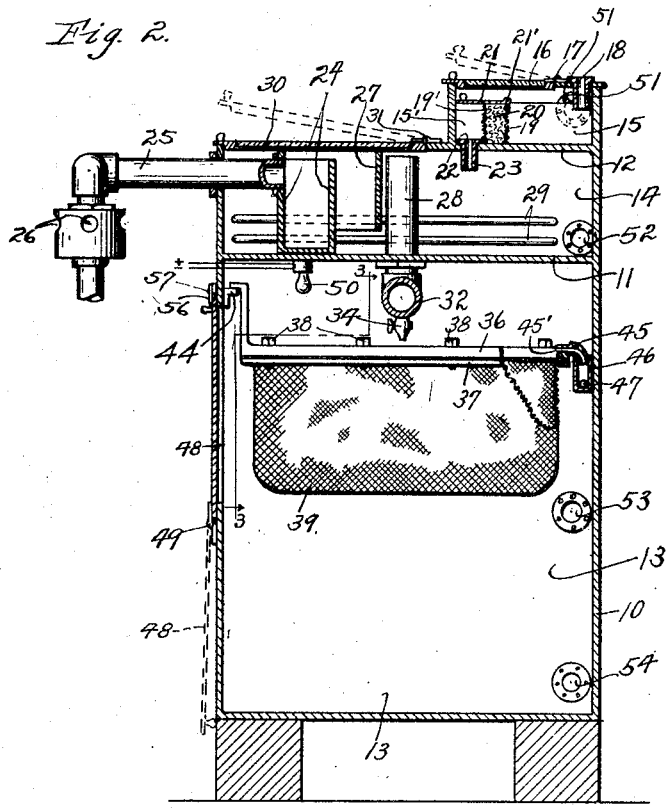
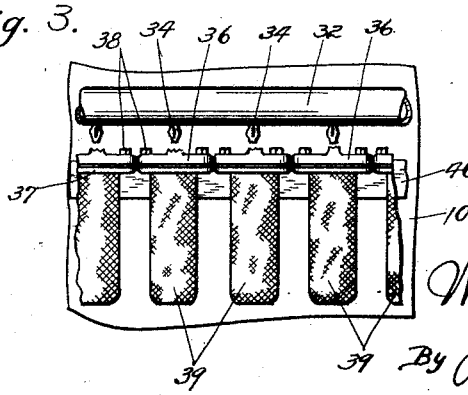

Patented May 5, 1925.

1,536,912

UNITED STATES PATENT OFFICE.

WILLIAM W. NUGENT, OF CHICAGO, ILLINOIS.

OIL-PURIFYING MECHANISM.

Original application filed February 23, 1918, Serial No. 218,643. Divided and this application filed November 29, 1920. Serial No. 426,970.

*To all whom it may concern:*

Be it known that I, WILLIAM W. NUGENT, a citizen of the United States, residing at Chicago, in the county of Cook and State of Illinois, have invented certain new and useful Improvements in Oil-Purifying Mechanism, of which the following is a specification.

My invention relates to apparatus for removing impurities from lubricating oil, and the like, and has for one of its objects the provision of simple and efficient means for automatically separating water, dirt and other foreign material from lubricating oils, and the like.

A further object is the provision of a device of the character mentioned which has its parts easily accessible.

Other objects will appear hereinafter.

An embodiment of my invention is illustrated in the accompanying drawings, forming a part of this specification, and in which—

Fig. 1 is a front view of an oil purifying device embodying my invention and having portions of the casing removed to show internal parts;

Fig. 2 is an enlarged section taken on line 2—2 of Fig. 1; and

Fig. 3 is an enlarged fragmental section taken on line 3—3 of Fig. 2.

Referring more particularly to the drawings, I have indicated a housing 10 having a horizontal partition 11 in its upper portion and a similar partition 12 above the partition 11. These partitions divide the casing 10 into chambers 13, 14 and 15. Chamber 13 is a purified oil receptacle and housing for the filtered elements. The intermediate section 14 is a chamber for washing and separating water from oil, and the like, and the upper chamber 15 is for separating dirt and other solid materials from the oil.

A door 16 pivoted as at 17 forms a part of the upper wall of housing 15 and is provided to gain access to the interior of said chamber. The door may extend the full length of said chamber or made in any desired length.

One or more filling openings are provided in chamber 15 with short pipes 18 therein reaching downwardly some distance into said chamber.

Extending longitudinally of said chamber 15 on the bottom of the latter are two parallel partitions 19 and 19' between which is a filtering material 20, such as cotton waste or other fibrous material, such material substantially filling the space between said partitions. The partitions 19, 19' do not reach the top of chamber 15 and at the top of partition 19 is hinged a door 21 resting on partition 19' and which covers the material 20 and chamber 15' between partition 19' and its adjacent wall of the casing. In the bottom of chamber 15' are a plurality of openings 22 which carry oil and water coming through the partitions down out of chamber 15' into chamber 14.

In each of the openings 22 is a pipe 23 which extends downwardly below the oil level in chamber 14. The oil level of chamber 14 is determined by the top of a well 24 in chamber 14, and a discharge pipe 28. The well 24 is provided with a waste pipe 25 through which the water overflows and is conducted away from the device. The pipe 25 may be provided with observation windows 26 through which an operator can see the water passing and determine whether or not there is oil passing over with the water.

In the chamber 14 is a partition 27 which extends the full length of such chamber and has its upper edge well above the oil level of such chamber and its lower edge spaced above the bottom of said chamber. The partition 27 is provided to prevent oil from passing over the top into well 24, since water is heavier than oil, the oil will remain on top and the water pass under partition 27 and over into well 24 and run away through pipe 25.

When the oil has raised in chamber 14 until its level is higher than the top of a discharge pipe 28 such oil passes down through the pipe 28 from chamber 14 into chamber 13. A heating element 29 is indicated in chamber 14 to warm up the oil and water so that they may be more easily separated. Steam pipes are indicated, but any other form of heater may be used when so desired.

Chamber 15 is preferably considerably narrower than chamber 14 thereby exposing a part of the upper wall of said chamber 14. This portion of the upper wall of chamber 14 is provided with a door 30 hinged as at 31 so that upon opening said door the interior of the chamber 14 may be inspected. The door 30 may be a single door extending substantially the full length of chamber 14 or made in any other desirable manner.

Discharge pipe 28 reaches down into chamber 13 and is provided with a horizontally disposed header pipe 32 and the latter preferably extends the full length of chamber 13. The ends of pipe 32 may be sealed by caps 33 or in any other desirable manner. By providing caps they may be easily removed for cleaning out said pipe 32 should it become dirty. Positioned along the header pipe 32 are a plurality of valves 34. I preferably provide one of the valves for each of the filter elements 35 of the device, one filter element being positioned directly under each valve 34 to receive its supply of oil therefrom. The filter elements shown are substantially alike and each comprises frame portions 36 and 37 secured together by screws 38 and clamping the top edge of a filter bag 39 therebetween. The filtering elements may be formed in any desirable manner and arranged as desired. At one end of frame part 36 I provide an arm 42 which reaches upwardly and has a flat toe portion 43 which rests on an angle bar rack 44. The angle bar 44 preferably extends the full length of chamber 13 so that one end of each of the filter elements can be supported therefrom. The other end of each of the filter frames is provided with an opening 45' in which is fitted a downwardly curved pipe 45 forming a spout through which the oil will flow before it can flow over the top of the filter frame. Each spout 45 also supports one end of the filter frame and rests on an edge of a trough 46 which is secured to the inner wall of casing 10 and preferably at a lower level than the angle bar ledge 44. The trough 46 also extends the full length of chamber 13 and has a discharge pipe 47 extending out of the casing so that any oil which may pass from the filter frames into said trough may pass out of the casing and not overflow into the clean oil at the bottom of chamber 13. Each filter element is therefore mounted independently of the others and is separately removable so that any one filter element can be taken out of the device without interfering with the operation of any of the other filtering elements.

At the front side of casing 10 I provide an opening leading into chamber 13 and covering said opening is a door 48 hinged along its lower side as at 49 to the casing. The door 48 preferably extends substantially the full length of the casing so as to expose all of the filter elements when it is open. An illuminating device, such as an electric lamp 50, may be provided in the chamber 15 to facilitate examining the filter elements and the other interior parts of said chamber.

I have indicated openings 51, 52, 53 and 54 in an end of casing 10. Opening 51 is provided with its lower edge slightly lower than the top of partitions 19, 19'. The partitions 19, 19' are preferably shorter than the chamber 15 at one end of the latter and provided with a cross partition 51' which provides a chamber 51'' adjacent the opening 51. With this arrangement should the filtering material 20 become clogged the oil would overflow partition 51' into chamber 51'' and out through opening 51 so as to prevent the dirty oil from passing down through opening 22 into chamber 14.

Opening 53 provides an overflow for chamber 13 so that when the filtered oil substantially reaches the lower ends of filter bags 39 such filtered oil will pass out of the casing to a suitable receptacle, not shown.

Opening 52 which may normally be closed provides a cleaning opening for chamber 14. Sometimes sediment settles in the bottom of chamber 14 and by providing opening 52 which can be opened, cleaning of such sediment out of chamber 14 will be easy. A suitable cleaning tool, not shown, can be inserted either through opening 52 or through door 30 to facilitate the cleaning operation of said chamber. During such operation the discharge pipe 28, well 24 or baffle plate 27 will not interfere with such cleaning operations.

Opening 54 may be connected to any form of apparatus, not shown, where the purified oil is desired, and should such apparatus not use the oil as fast as it is cleaned, the superfluous oil would run out through opening 53, as above indicated.

Door 48 is preferably hinged along its bottom edge so that it will tend to remain open when once opened so as not to interfere with removing the filter elements. It will be seen from this arrangement that the filtering elements may be used until overflow is indicated at the discharge pipe 47 at one end of the purifying structure. By observing through door 48 the element which is overflowing may be discovered and removed for cleaning because the overflow indicates that the dirt or sediment accumulated in such element has become too great to permit of normal filtering. If it is desired the valve 34 at the top of such filter element may be closed and the filter element not cleaned until a later time. This will not interfere with the operation of the other filter bags. It will simply reduce the total filtering capacity of the device to the extent of the oil filtered by such bag.

The door opening is preferably of such a height to permit the free removal of the filter element filled with oil without spilling the latter into the lower portion of the housing 10. With my improved construction this may readily be done by lifting the curved spout 45 from its seat on the upper edge of trough 46 and lifting the hanger 42 from its shelf or rack 44 whereupon by proper movement of the filter element the hanger 42 may be brought under the shelf 44 and then removed upwardly a sufficient distance to permit the filtering element to easily pass out of the door opening.

Any suitable means may be used for holding the door 48 closed when desired. I have indicated buttons 56 pivoted as at 57 to the casing and adapted to engage the door to hold it shut. It should be observed that since the member 42 extends upwardly a considerable distance above the filter element proper and the spout 45 is in the form of a hook fitting over the edge of trough 46 that the filter elements will be held by gravity in operative positions. The foot portions 43 may be formed flat on their supporting surfaces so that such flat surfaces resting on ledge 44 will further facilitate holding the filter bags in operative positions.

In operation oil containing impurities is fed into chamber 15 through pipe 18 and the solid material held in said chamber 15 with the oil and other liquids passing out through filter material 20 and down through pipe 23 into chamber 14. Since water is heavier than oil the water will remain at the bottom of chamber 14 raising the oil up until it runs over into discharge pipe 28 and thence downwardly to the filtering elements, as above mentioned. As the water accumulates in chamber 14 it would raise up and run over into well 24 and out through pipe 25, as already mentioned.

This application is a division of applicant's copending application, Serial No. 218,643, filed February 23, 1918, on oil purifying mechanism, and no claim is made herein to the specific filtering elements described and claimed in said copending application.

Obviously those skilled in the art may make various changes in the details and arrangement of parts without departing from the spirit and scope of my invention as defined by the claims hereto appended, and I therefore wish it to be understood that I do not desire to be restricted to the exact construction herein disclosed.

I claim:—

1. A casing enclosing a reservoir, a water separating chamber and a dirt separating chamber with the latter elevated above the other chamber; two spaced screens having their top edges spaced from the top of the reservoir and dividing the elevated dirt separating chamber into two compartments, there being a filling opening in one of said compartments and a discharge opening leading from the other of said compartments downwardly into the water separating chamber; and filtering material substantially filling the space between said screens.

2. An oil purifying apparatus comprising a casing; horizontal partitions dividing the interior of said casing into chambers at different elevations; two spaced foraminous partitions extending upwardly from the bottom of the top chamber; a door covering the space between said foraminous partitions; and porous material substantially filling the space between the foraminous partitions, there being a discharge opening in the bottom of the top chamber at one side of said foraminous partitions and leading into the next lower chamber.

3. In combination, a casing; horizontal partitions dividing the interior of the casing into a top dirt separating, an intermediate water separating chamber and a lower reservoir chamber; two spaced perforated partitions extending upwardly from the bottom of the dirt separating chamber dividing the latter into two compartments; a door hinged to one of said perforated partitions and extending horizontally across the space between the partitions in the top chamber, there being a feed opening for the top compartment and a discharge opening between the top chamber and the water separating chamber; and fibrous material in the space between the perforated partitions.

4. Oil purifying apparatus comprising a casing; a horizontal partition dividing the interior of the casing into an upper dirt separating chamber and a lower water separating chamber; dirt and oil separating means in the upper dirt separating chamber; a partition extending downwardly from the top of the water separating chamber with its lower edge spaced above the bottom of said water separating chamber and dividing the latter into two compartments; a pipe extending upwardly from the bottom of the water separating chamber for conducting oil from one of said compartments; and overflow means for conducting water from the other of said compartments.

5. Oil purifying apparatus comprising a casing; a horizontal partition dividing the interior of the casing into an upper dirt separating chamber and a lower chamber and water separating chamber; dirt and oil separating means in the dirt separating chamber; a partition extending downwardly from the top of the water separating chamber with its lower edge spaced above the bottom of said water separating chamber and dividing the latter into two compartments; a pipe extending upwardly from the bottom of said water separating chamber with its receiving end opening into the upper portion of one of said compartments; and a discharge pipe having its receiving end opening in the upper portion of the other compartment at a height lower than the opening of the first-mentioned pipe.

6. An oil purifying apparatus comprising a casing enclosing an upper dirt separating chamber and a lower water separating chamber; a partition extending down from the top of the water separating chamber to near the bottom of the latter dividing said water separating chamber into two compartments; an oil discharge pipe extending upwardly from the bottom of the separating chamber with its receiving end opening near the top of and into one of said compartments; a water discharge pipe opening near the top of and in the other of said compartments, the opening of the water discharge pipe being below the opening of the oil discharge pipe; and pipes leading downwardly from the dirt separating chamber with their lower discharge ends below the level of the upper opening in the oil discharge pipe.

7. Oil filtering apparatus comprising a tank having a door opening in one of its vertical sides; a ledge above the door opening at one side of the tank; a trough parallel to the ledge and at a height intermediate the top and bottom of the door; a plurality of spaced filter bag frames between the ledge and trough; an arm at one end of each of said frames extending upwardly from the latter and resting on said ledge; and a curved pipe support attached to the other end of each of the filter bag frames with its open end directed downwardly toward the bottom of said trough.

8. Oil purifying apparatus comprising a casing, horizontal partitions in the casing dividing the interior of the latter into an upper dirt separating chamber, an intermediate water separating chamber and a lower reservoir chamber, the dirt separating chamber being narrower than the water separating chamber and located on the rear side of the casing to afford a horizontal edge above the water separating chamber on the front side of the casing, a horizontal door for the top of the dirt separating chamber and adapted to be opened upwardly, a horizontal door for the ledge portion of the water separating chamber and also adapted to be opened upwardly, and an upright door for an opening in the front side of the reservoir chamber.

9. Oil purifying apparatus comprising a casing having a top dirt separating chamber, an intermediate water separating chamber and a lower reservoir chamber, the top compartment being narrow to afford a ledge above a portion of the water separating chamber, a door for the top dirt separating chamber and when open permitting large quantities of oil to be introduced for purification, a door for the ledge portion of the water separating chamber affording a support when closed and facilitating cleaning of the water separating chamber when open, filtering mechanism in the reservoir chamber, and a door for the reservoir chamber which when open permits inspection of the filtering mechanism and attention thereto.

10. Oil purifying apparatus comprising a casing divided into three superposed compartments, the top compartment being narrow to afford a ledge for the upper front portion of the intermediate compartment, said intermediate compartment extending under the top compartment and located on top of the lower compartment, a door for covering a top opening in the top compartment, an additional door for covering an upper opening in the ledge portion of the intermediate compartment, and an upright door for an opening in the front side of the lower compartment.

11. In combination, a casing enclosing a reservoir chamber, a plurality of filters, means for supporting filters detachably each being adapted to be removed by manual lifting from said supporting means through an opening in the casing, said supporting means being adapted to support the filters in a straight line series in horizontal alinement with their tops all substantially at the same level, and a door in the casing for said opening with the top edge of the opening above the tops of the filters and the bottom edge of the opening below the tops of the filters, the filters being thereby adapted to be inspected at their tops and sides and individually adapted to be removed from the casing chamber and replaced by another filter individually.

12. In combination, a casing enclosing a chamber having a door opening therein; a horizontal ledge disposed above the door opening in the casing; a ledge on the inner wall of the casing opposite the door and substantially parallel with the first-mentioned ledge; a plurality of filter frames supported at their ends on said ledges; and filter bags secured to the frames.

13. In combination, a casing enclosing a chamber having a door opening therein; a horizontal ledge disposed above the door opening in the casing; a ledge on the inner wall of the casing opposite the door and substantially parallel with the first-mentioned ledge and lower than the latter; a plurality of horizontal filter frames disposed at substantially the height of the second-mentioned ledge; arms on the filter frames extending upwardly and resting on the first-mentioned ledge; supporting means on the filter frames resting on the second-mentioned ledge; and filter bags secured to the filter frames.

14. In combination, a casing enclosing a chamber; two substantially parallel ledges on the inner walls of the casing; filter frames disposed edge to edge in said chamber supports on said frames engaging said ledges, one of the supports of each frame being hollow and providing a discharging means for the frame below the top of the latter, the centers of gravity of the filter frames being below the points of support of said frames on said ledges; and filter bags secured to the filter frames.

15. In combination, a casing enclosing an oil reservoir chamber, said casing having a horizontal longitudinal opening in its upper vertical portion, two substantially parallel ledges from either walls of the casing, a series of filter elements supported on said ledges in horizontal alinement parallel to the opening in said casing in position to have each inspected at the tops and sides thereof through such opening, and supporting mechanism on each filtering element for engaging said ledges and adapting each filter element to be individually removed from such series through said opening and replaced by another filter element without disturbing the other filter elements of the series.

16. In combination, a casing enclosing a chamber; a substantially horizontal ledge on the inner wall of the casing; a trough on the inner wall of the casing substantially parallel with said ledge; a filter frame disposed between said ledge and trough; a pipe secured to the frame and resting on said trough providing a communication between the interior of the frame and the trough; an arm on the frame resting on said ledge; and a filter bag secured to the frame.

17. In combination, a casing enclosing a chamber; a substantially horizontal ledge on the inner wall of the casing; a trough on the inner wall of the casing substantially parallel with said ledge but lower than the latter; a filter element disposed between said ledge and trough at substantially the height of the latter; a pipe secured to the frame and resting on said trough providing a support for one end of the frame and a communication between the interior of such frame and the trough; and an arm on the frame extending upwardly therefrom with a flat portion resting on said ledge facilitating holding the filter element in horizontal position.

18. In combination, a casing enclosing a chamber; a substantially horizontal ledge on the inner wall of the casing; a trough on the inner wall of the casing and disposed substantially parallel with said ledge; a filter element disposed between the ledge and trough; a pipe extending from the interior of said filter element and resting on the trough with its discharge end adapted to discharge fluids into said trough; and an arm on the filter element resting on the ledge, said arm and said pipe being the sole supports of the filter element.

19. In combination, a casing enclosing a chamber, a plurality of substantially horizontal filter frames individually mounted and each removable from the casing by manually lifting the same through an opening in the casing, a filter bag secured to each of said frames with the interiors of said bags in communication with the interiors of said frames, overflow mechanism for receiving material from the filter bags when the latter tend to overflow after becoming clogged with material filtered from the liquid, and means individual to each filter frame for directing such overflowing liquid to the overflowing mechanism, each of said filter frames with its filter bag being removable through said opening for cleaning and renewal.

20. In combination, a casing enclosing a chamber, a plurality of filter frames each having an overflow discharge spout, overflow mechanism adapted to receive each of the discharge spouts of said filter frames, a filter bag secured to each of the filter frames, and means for supporting the filter frames in said chamber for individual manual removal therefrom independently of the remaining filter frames.

21. In filtering apparatus, the combination with a casing having an opening in an upright side thereof, of a filter bag, a frame for supporting said bag in position for removal from said casing through said lateral opening, said opening being of sufficient size to permit manually holding said frame to prevent oil spilling from said bag while being removed from the casing, a door for normally closing said opening, an overflow spout for said frame, overflow mechanism co-acting with said spout to direct oil from the filtering bag when the latter becomes clogged with filtered material, and means for detachably supporting said frame and said filter bag within the casing with said spout in overflowing position.

22. In filtering apparatus, the combination with an oblong tank for containing filtered oil, of a plurality of removable filtering elements each comprising a filtering bag and a metal supporting frame, means for removably supporting said frames along the longitudinal upper portion of said tank with the bags in suspension and arranged in spaced-apart relation in series, overflow mechanism comprising a spout on each of said frames removably connected to an overflow passageway, and a longitudinal door extending along the whole tank for an opening in a vertical side of the tank permitting inspection of the individual filtering elements and permitting removal of any one of them in condition of overflow through such opening and from the tank for renewal without spilling the unfiltered oil in such filtering element into the tank during such removal, 23. In filtering apparatus, the combination with a tank for containing filtered oil, of a plurality of removable filtering elements each comprising a filtering bag and a supporting frame, means comprising a ledge above an opening in one of the vertical walls of said tank for supporting said filtering elements independently of each other with the bags in suspension and arranged in spaced apart relation with the mouths of said bags at said supporting frames visible through said opening to determine whether any bag requires renewal, and overflow mechanism, comprising a spout on each of said frames removably connected to an overflow passageway, the latter being individually adapted to be lifted off said supporting means and removed horizontally through said opening with its bag full of oil and the upper surface of the oil remaining in a substantially horizontal plane to prevent spilling of unfiltered oil into said tank.

24. In combination, a casing having a filter removing opening in one of its vertical sides, a plurality of filter elements each comprising a bag and a frame at the mouth thereof, means for removably supporting said filter elements for individual removal, said means comprising a supporting ledge on an inner wall of the casing above said opening, and overflow mechanism comprising a spout on each of said frames removably connected to an overflow passageway.

25. In combination, a casing having a filter viewing opening in one of its vertical walls, a ledge on an inner wall of said casing above said opening, a removable filter element comprising a frame and an arm extending therefrom to rest on said ledge and also comprising a filter bag secured to said frame, and overflow mechanism comprising an overflow spout on said frame adapted to be removably connected to an overflow passageway.

26. Filtering apparatus comprising a reservoir chamber, a plurality of removable filtering elements each comprising a filtering bag and a supporting frame, means for supporting said filtering elements for individual removal and replacement, and overflow mechanism comprising a spout connected rigidly to each of said supporting frames removably connected to an overflow passageway.

27. Filtering apparatus comprising a casing having a reservoir chamber, a removable filter element comprising a frame and a filter bag suspended therefrom, means for detachably supporting one end of said frame in said chamber, an overflow passageway connected to said casing, and an overflow spout rigidly connected to the other end of said frame adapted to rest detachably on said overflow passageway for support thereby when the filtering bag is in filtering position.

In testimony whereof I have signed my name to this specification on this 26th day of November, A. D. 1920.

WILLIAM W. NUGENT.